US010278370B2

(12) United States Patent
Put et al.

(10) Patent No.: US 10,278,370 B2
(45) Date of Patent: May 7, 2019

(54) HIVE-MOUNTED DISSEMINATOR DEVICE

(75) Inventors: Kurt Hans Put, Westerlo (BE); Kris Cyriel Johan Jans, Westerlo (BE); Guido Mario Karel Michel Sterk, Westerlo (BE); Guy Smagghe, Brussels (BE); Veerle Mommaerts, Brussels (BE); Felix Leopold Wackers, Westerlo (BE); Yann Bruno Loic Jacques, Westerlo (BE)

(73) Assignees: Biobest Belgium NV, Westerlo (BE); Vrije Universiteit Brussel, Brussels (BE)

(*) Notice: Subject to any disclaimer, the term of this patent is extended or adjusted under 35 U.S.C. 154(b) by 890 days.

(21) Appl. No.: 13/321,348

(22) PCT Filed: May 29, 2010

(86) PCT No.: PCT/EP2010/057508
§ 371 (c)(1),
(2), (4) Date: Nov. 18, 2011

(87) PCT Pub. No.: WO2010/136599
PCT Pub. Date: Dec. 2, 2010

(65) Prior Publication Data
US 2012/0077412 A1    Mar. 29, 2012

(30) Foreign Application Priority Data

May 29, 2009  (GB) .................................. 0909172.9
Apr. 26, 2010  (GB) .................................. 1006909.4

(51) Int. Cl.
*A01K 47/06*    (2006.01)
*A01K 51/00*    (2006.01)

(52) U.S. Cl.
CPC .............. *A01K 47/06* (2013.01); *A01K 51/00* (2013.01)

(58) Field of Classification Search
CPC .............................. A01K 47/00; A01K 47/06
USPC .................. 449/15, 20, 21, 23, 24, 25, 32, 3
See application file for complete search history.

(56) References Cited

U.S. PATENT DOCUMENTS

| 430,104 A | * | 6/1890 | Alley ............................... 449/7 |
| 993,060 A | * | 5/1911 | Hand ............................... 449/7 |
| 2,435,951 A | * | 2/1948 | Antles ............................ 449/19 |
| 3,200,419 A | * | 8/1965 | Root ................................ 449/2 |
| 3,371,360 A | * | 3/1968 | Antles et al. .................. 449/19 |

(Continued)

FOREIGN PATENT DOCUMENTS

GB      1470385 A  *  4/1977
WO   02/094014 A1    11/2002

OTHER PUBLICATIONS

Dag et al., "Pollen dispensers (inserts) increase fruit set and yield in almonds under some commercial conditions", Journal of Apicultural Research 39 (3-4), pp. 117-123, 2000.

(Continued)

*Primary Examiner* — Lisa L Tsang
(74) *Attorney, Agent, or Firm* — Dinsmore & Shohl LLP

(57) ABSTRACT

The present invention relates to the dissemination of biological control agents or other substances through the use of bees, in particular bumblebees. It relates to a disseminator device, installable in or in connection to the hive, and which contains biological control agents or other substances which are picked up, carried and disseminated by the bees when leaving the hive.

23 Claims, 15 Drawing Sheets

(56) References Cited

U.S. PATENT DOCUMENTS

| | | | | |
|---|---|---|---|---|
| 4,158,900 | A * | 6/1979 | Musgrove | 449/23 |
| 4,229,848 | A * | 10/1980 | Shaparew | 449/23 |
| 5,348,511 | A | 9/1994 | Gross et al. | |
| 5,989,100 | A | 11/1999 | Kovach | |
| 7,310,907 | B2 * | 12/2007 | Suteerawanit | 43/122 |
| 2007/0224913 | A1 * | 9/2007 | Brisson | A01K 51/00 449/3 |
| 2008/0280528 | A1 * | 11/2008 | Mudd | A01K 51/00 449/2 |

OTHER PUBLICATIONS

Maccagnani et al., "Investigation of hive-mounted devices for the dissemination of microbiological preparations by Bombus terrestris", Bulletin of Insectology 58 (1), pp. 308, 2005.

Peng et al., "Evaluation of microrganisms for biocontrol of Botrytis cinerea in strawberry", Canadian Journal of Plant Pathology 13, pp. 247-257 1991.

Sutton et al., "Manipulation and Vectoring of Biocontrol Organisms to Manage Foliage and Fruit Diseases in Cropping Systems", Annu. Rev. Pytopathol. 31, pp. 473-493; 1993.

J. C. Sutton, "Evaluation of Micro-organisms for Biocontrol: Botrytis Cinerea and Strawberry, A Case Study", Advances in Plant Pathology, vol. 11, Chapter 9, 1995.

Search Report for Application No. PCT/EP2010/057508 dated Dec. 1, 2010.

International Preliminary Report on Patentability for International Application No. PCT/EP2010/057508 dated Dec. 8, 2011.

\* cited by examiner

HIVE-MOUNTED DISSEMINATOR DEVICE

FIELD OF THE INVENTION

The present invention relates to the dissemination of biological control agents or other substances through the use of bees, including honeybees and bumblebees, with in particular bumblebees. It relates to a disseminator device, installable in or in connection to the hive, and which contains biological agents or other substances including agrochemicals, which are picked up, carried and disseminated by the bees when foraging outside the hive.

BACKGROUND TO THE INVENTION

Crops need to be protected against a broad range of diseases and pests. Flowers can be important pathways of plant disease infection or sites of pest occurrence. The pathogen infects them under favorable conditions, and progressively colonizes other tissues or fruits. Disease symptoms become visible when infected tissues ripen, senesce or die, as for example in the case of *Botrytis cinerea*. Effective disease and pest control depends both on the use of suitable crop protection products, either chemical or biological (microbial or microbial agents), and on the methods and strategies for introducing, promoting and maintaining the antagonist in the crop (Sutton and Peng, *Annual Review of Phytopathology*, 1993, 31, pg. 473-493).

The use of microbiological antagonist preparations against flower-borne diseases and pests could be particularly effective if dissemination of the antagonist occurs directly to the flower parts during bloom (Peng and Sutton, *Canadian Journal of Plant Pathology*, 1991, 13, pg. 247-257). Pronubial insects are known to deliver pollen, fungi and bacteria (Dag et al., *Journal of Apicultural Research*, 2000, 39, Pg. 117-123). Hence, while performing their pollination service, pronubial insects might also serve as carriers of antagonistic agents, providing potential disease and pest control in addition to pollination services (Sutton and Peng, *Annual Review of Phytopathology*, 1993, 31, pg. 473-493; Sutton, *Advances in Plant Pathology*, 1995, 11, 171-188).

Worldwide over 500,000 colonies of *B. terrestris* (L.) are purchased annually for pollination service on various crops, predominantly on tomatoes. In addition to pollination and indirect disease control, these pronubial insects may also perform an active role in preventing disease or pest control by conveying for example microbiological preparations directly onto flowers or other plant parts. This requires that the bees themselves are previously loaded with propagules of the antagonist (Sutton and Peng, *Annual Review of Phytopathology*, 1993, 31, pg. 473-493). For the latter a dispenser can be mounted on the exit of the beehive. Existing dispenser such as the side-by-side passageway dispenser (SSP) and the overlapping passageway dispenser (OP) have certain drawbacks in loading the bees.

The SSP-dispenser showed several functional limits, as evidenced by the absence of antagonistic propagules on most of the captured and analyzed bees. Inoculum density on bumblebees was also rather low. The SSP-dispenser was also not efficient in separating outgoing and incoming bees: many bees exited the colony box through the darkened straight passageway thus eluding the powder preparation, whereas others crawled through the zigzag passageway, but walked along the side walls. Furthermore the bees promptly smeared the zigzag passageway with their liquid excrements which, once kneaded with the antagonistic powder preparation, caused the latter to lose its consistency making it no longer suitable for bee loading (Maccagnani B. et al., 2005, Bulletin of Insectology 58(1): 3-8)

With the OP dispenser only a limited amount of propagules of the antagonist can be loaded in the lower exit passage and the loading of the bees leaving the hives quickly diminishes. A further disadvantage of the OP-dispenser is the different dimensions of the upper and lower passageway. The upper passageway is broader and higher compared to the lower passageway, as a consequence and given the range in size of bumblebees in a hive, some of the larger bees may leave the hive through the upper passageway of the OP-dispenser and get stuck in the narrower lower passageway. Also, the difference in floor level between the upper and the lower passageway has a negative effect on light entering the exit hole of the hive.

In addition, for both the SSP-dispenser and the OP-dispenser, the inoculum density on flowers and the percentage of colonized flowers were significantly lower than in comparable spray treatment (Maccagnani B. et al., 2005, Bulletin of Insectology 58(1): 3-8). Also, both the SSP and OP dispenser are at the exterior of the beehive, and accordingly sensitive to changes in temperature. For example fully exposed in a greenhouse the temperature increase within the dispenser may not only be detrimental to the control agent but also prevents the bees from leaving the hive.

It is accordingly a general object of the invention to provide a beehive dispenser to overcome the problems mentioned hereinbefore. As provided in more detail hereinafter, the beehive disseminator of the present invention assures a unidirectional exit passage of the bees through the dispenser, thereby preventing bees from entering through the exit (i.e. from entering through the dispenser). An independent and again unidirectional entry pathway is realized through a second chamber, thereby preventing bees from leaving the hive through the entrance. In a particular embodiment the exit and entrance are integrated into one visual unit, contributing to a swift entry by returning bees. Furthermore, the dispenser has a high loading capacity for the agent to be disseminated, it prevents that the bees clear a path in the product, which would prevent effective loading, and thus provides an optimal loading of the bees with a short passage time. The dispenser can be filled through perforation in the top of the chamber. Finally, it can be integrated within a hive to benefit from the internal temperature control. It can be made accessible through a removable top, a sliding mechanism or other means.

SUMMARY OF THE INVENTION

A hive disseminator device comprising a chamber (2); said chamber having apertures (4,5) at opposite side members of said chamber and having means (8) to amass and immobilize a substance at the floor member of said chamber; and characterized in that the apertures at the opposite side members of said chamber include means (5) to define a unidirectional pathway for bees through said chamber.

In a further embodiment, the hive disseminator further comprises a second, separate chamber (1) wherein said second chamber has apertures (3,6) at opposite side members and said apertures include means (3) to define a unidirectional pathways for bees through said second chamber. In a particular embodiment the unidirectional pathway through said second chamber is opposite to the unidirectional pathway through the chamber having means to immobilize a substance at its floor member, hereinafter also referred to as the dispenser chamber (2).

In said dispenser chamber (2) the means (8) to amass and immobilize a substance at the centre of the floor member, hereinafter generally referred to as means to immobilize a substance at the floor member of said chamber, are such that they prevent, either alone or in combination, that the bees are able to clear a path through the substance to be disseminated and are for example selected from one or more of a plurality of edges, a mesh, a series of slopes separated by a shallow edge, a halfpipe, ribbed paper, or the like. In a particular embodiment the means to immobilize a substance consists of a mesh (8), or a plurality of edges, ribs, ridges, bumps, etc. In a more particular embodiment the means to immobilize the substance at the floor member consists of a series of slopes separated by a shallow edge, said series of slopes being an integrated part of the floor member; or of a halfpipe with its longitudinal axis in the direction of the unidirectional pathway through said chamber, optionally comprising two or more of edges, ribs, ridges, bumps, etc. The means to immobilize the substance at the floor member can either be removable or are an integrated part of the floor member of the dispenser chamber. In a particular embodiment said means to immobilize a substance at the floor member of said chamber are an integrated part of said floor member. In a further embodiment said means are removable.

In both of the aforementioned chambers, the means to define a unidirectional pathway through said chamber consist of one or more downward directed exits at one end of said chamber and one or more entrances at the opposite end of said chamber. Alternatively, the means to define the unidirectional pathway may consist of a one-way door (9), such as for example a swing door, a trapdoor or hatch that opens in a single direction. In a particular embodiment the one way-door may comprise a small opening, e.g. at its base. Said opening lowers the initial barrier and encourages the bees to open the door.

As exemplified, the means to define a unidirectional pathway typically consist of outwardly directed and diagonally cut tubes or one-way doors, in particular diagonally cut conical tubes (3,5) or swing doors and the entrances typically include means (4, 3) to communicate with a hive entrance or exit. The means to communicate with a hive entrance or exit are usually selected from flexible tubes, rigid tubes, one-way doors or conical tubes. In an even further embodiment the entrances can be closed, such as for example with a sliding door. In case the means to define a unidirectional pathway is part of an actual exit from the hive, it preferably consists of a transparent material, more preferably a translucent material, i.e. such as a transparent or translucent diagonally cut conical tube, or a transparent or perforated one-way door. In case the means to define a unidirectional pathway is part of an actual entrance to the hive, it preferably consists of an opaque material, i.e. such as an opaque (dark) diagonally cut conical tube, alternatively an opaque one-way door.

In a particular embodiment of the hive disseminator device of the present invention, the chamber having the means to immobilize a substance, i.e. the dispenser chamber (2), defines an exit pathway for bees leaving the hive; and the second chamber (1) defines a pathway for bees entering the hive. In said embodiment the exit pathway is at least 5, 10, 15, 20 or 25 cm long.

In one embodiment of the present invention the chamber having the means to immobilize a substance, i.e. the dispenser chamber (2) has a rectangular base; one, two or more means to define a unidirectional pathway consisting of outwardly directed and diagonally cut transparent conical tubes (5) or one-way doors (9); a tetragonal entrance (4) and is further characterized in having an edge proximal to the entrance, to retain the means to immobilize a substance at the floor member of said chamber. In a particular embodiment said two or more means to define a unidirectional pathway through the dispenser chamber are at opposite side members of the dispenser chamber.

In a further aspect of said embodiment, the second chamber (1) has a rectangular base; a unidirectional exit consisting of an outwardly directed and diagonally cut opaque conical tube (3) or an opaque one-way door (9); and an entrance (6) optionally including means that communicate with the hive entrance, such as for example diagonally cut transparent conical tubes (5) or one-way doors (9).

In an alternative embodiment of the present invention the chamber having the means to immobilize a substance, i.e. the dispenser chamber has a trapezoid base and is further characterized in that the aperture(s) a the short side wall of said trapezoid base include means to communicate with a hive exit. The long side wall of said trapezoid based dispenser chamber has one, two or more downward directed exits consisting of outwardly directed and diagonally cut transparent conical tubes (5).

In a further aspect of said embodiment the second chamber (1) has a trapezoid base; a downward directed exit consisting of an outwardly directed opaque conical tube (3); and an entrance (6) including means that communicate with the hive entrance.

The two chambers making up the hive disseminator devices as described herein could consist of two separate chambers, but as exemplified, in a particular embodiment the chamber having the means to immobilize a substance, i.e. the dispenser chamber; and the second chamber taken together, define a single housing. In said particular embodiment the two chambers are either adjacent or superimposed, with in a more particular embodiment the dispenser chamber on top of the second chamber and further characterized in that the exit (5) of the dispenser chamber is superimposed vis-à-vis the entrance (6) of the second chamber. The superimposed exit (5) and entrance (6) are optionally framed with a visual mark (10), in particular a blue mark.

As such, the hive disseminator devices as defined herein can be placed outside and connected to the hive entrance and exit, or it can be placed within the hive. When placed inside the hive, the hive disseminator devices as defined herein will include means facilitating mounting of the device in a hive. In a particular embodiment the hive disseminator device is an integrated part of the hive top grid.

It is accordingly also an object of the present invention to provide a hive comprising a disseminator device as defined herein.

BRIEF DESCRIPTION OF THE DRAWINGS

With specific reference now to the figures in detail, it is stressed that the particulars shown are by way of example and for purposes of illustrative discussion of the different embodiments of the present invention only, and are presented in the cause of providing what is believed to be the most useful and readily description of the principles and conceptual aspects of the invention. In this regard no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE INVENTION

Figure 1A:
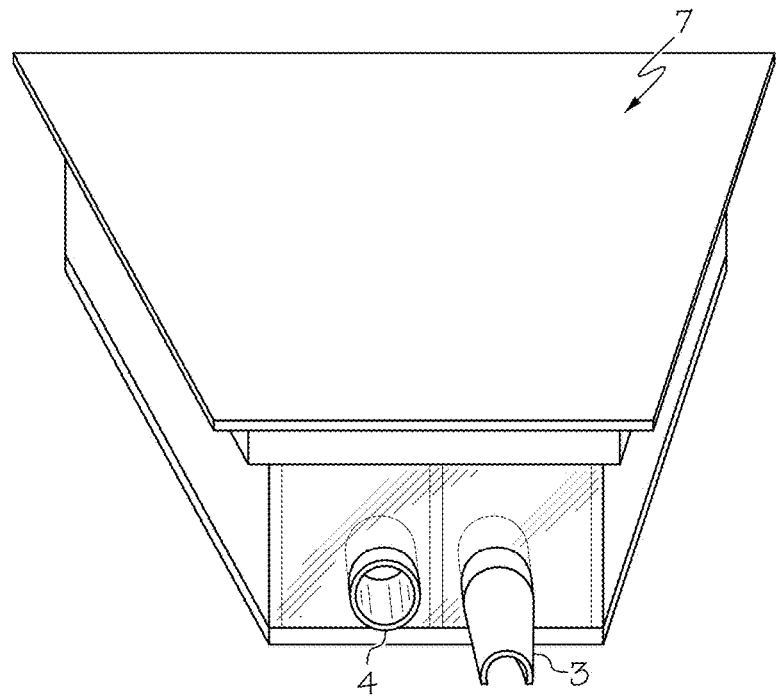
FIG. 1: Funnel-dispenser, A: rear view, B: side view, C: front view, D: top view. 1: entrance compartment, 2: trapezium-shaped exit compartment, 3: bumblebee in-closer connecting the entrance compartment with the bee hive, 4: connection of the exit compartment with the bee hive, 5: bumblebee in-closer exit openings, 6: entrance opening, 7: lid of the dispenser.
Figure 1B:
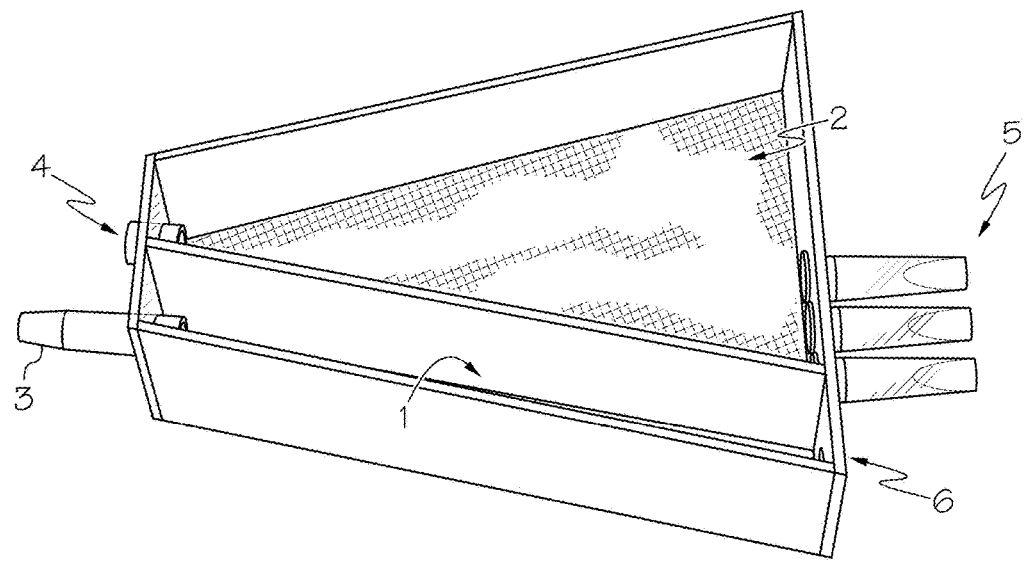
Figure 1C:
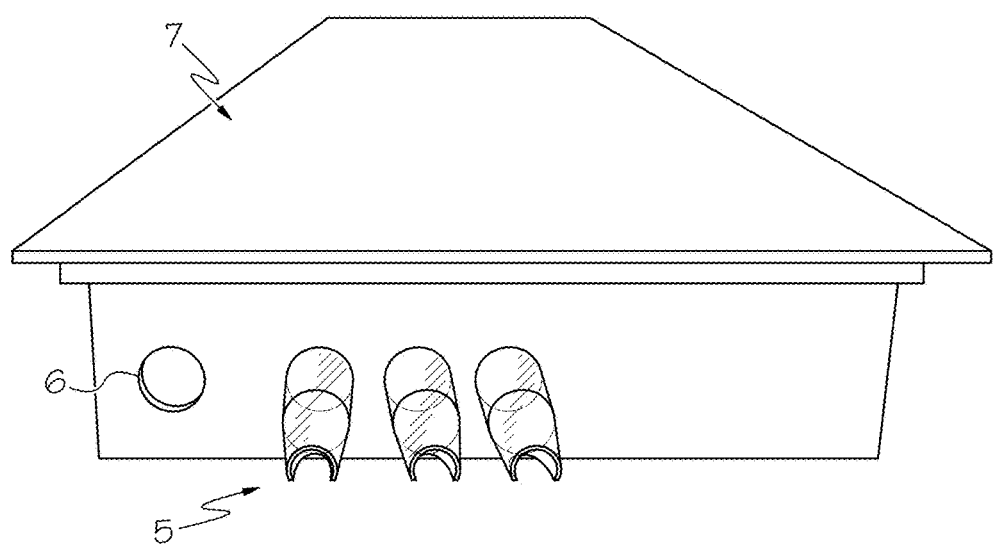
Figure 1D:
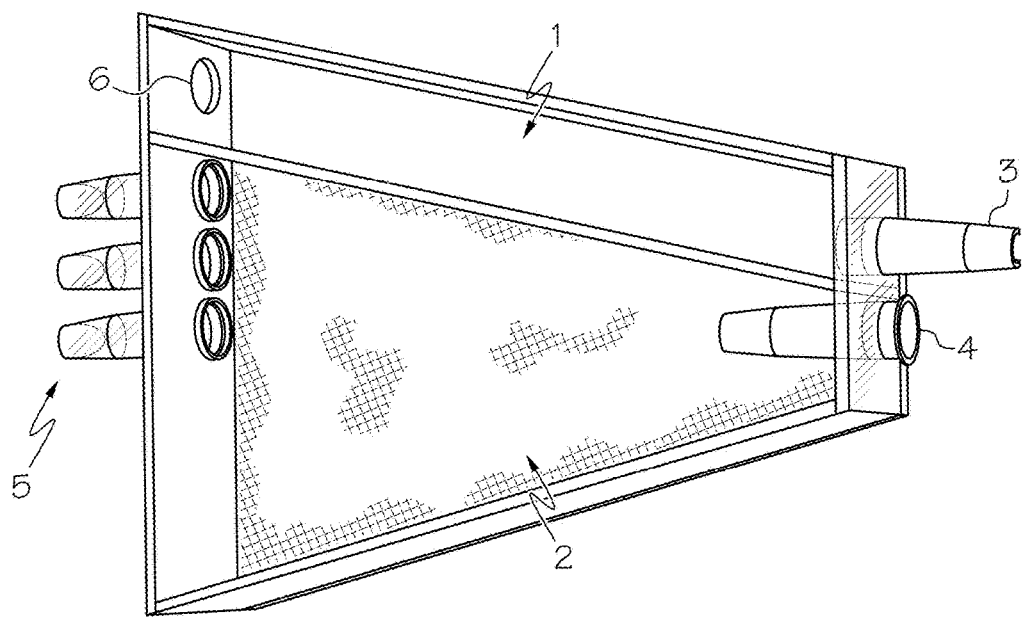
Figure 2:
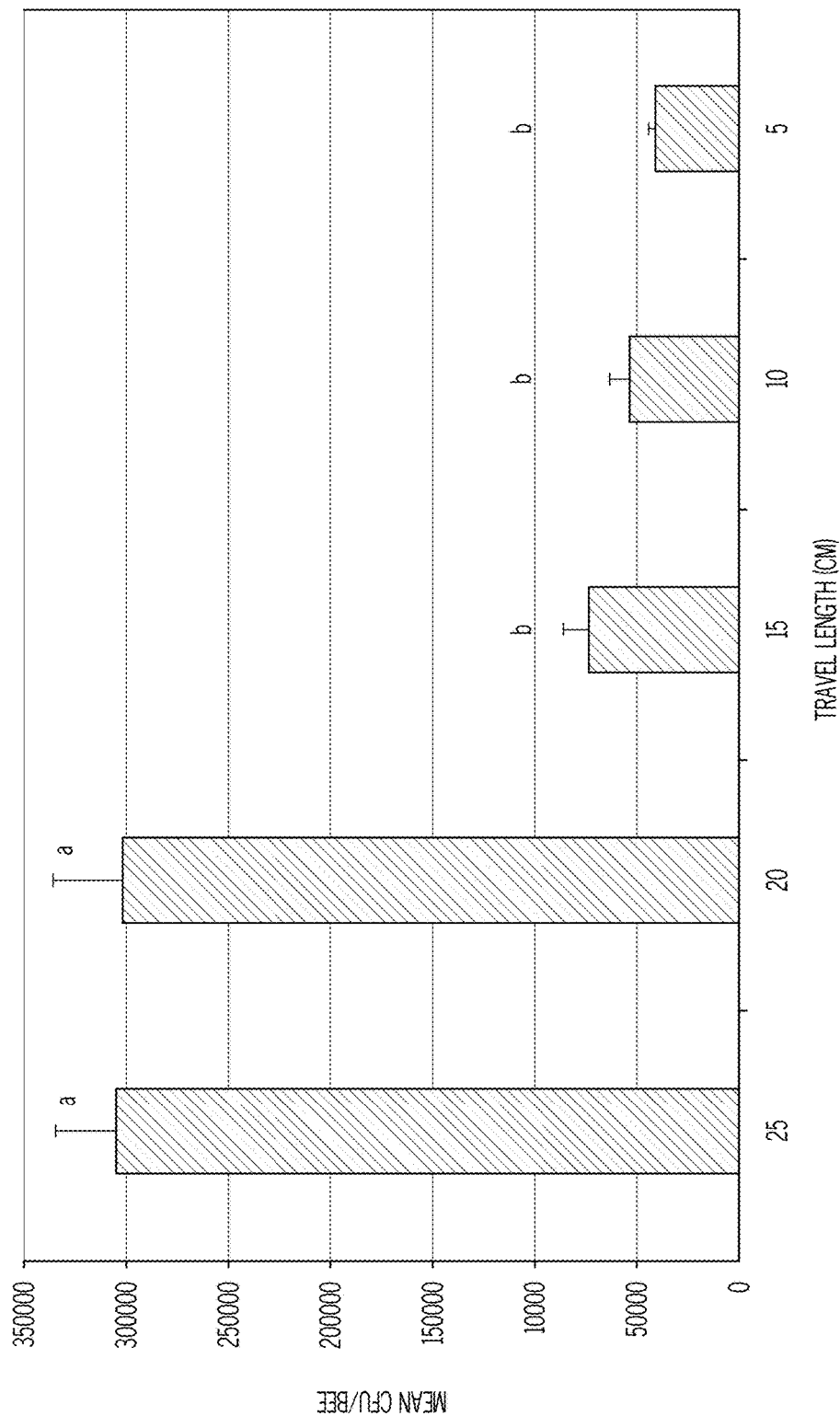
FIG. 2: Impact of the length of the Funnel-dispenser on the efficiency of loading of the body of workers of *B. terrestris*. The average numbers of CFU/bee are expressed as means (±SEM). ANOVA resulted in two groups (F=29.981; DF=149; P<0.001). Values that are followed by a different letter (a-b) are significantly different (Tukey-Kramer post-hoc test with P=0.05).
Figure 3:
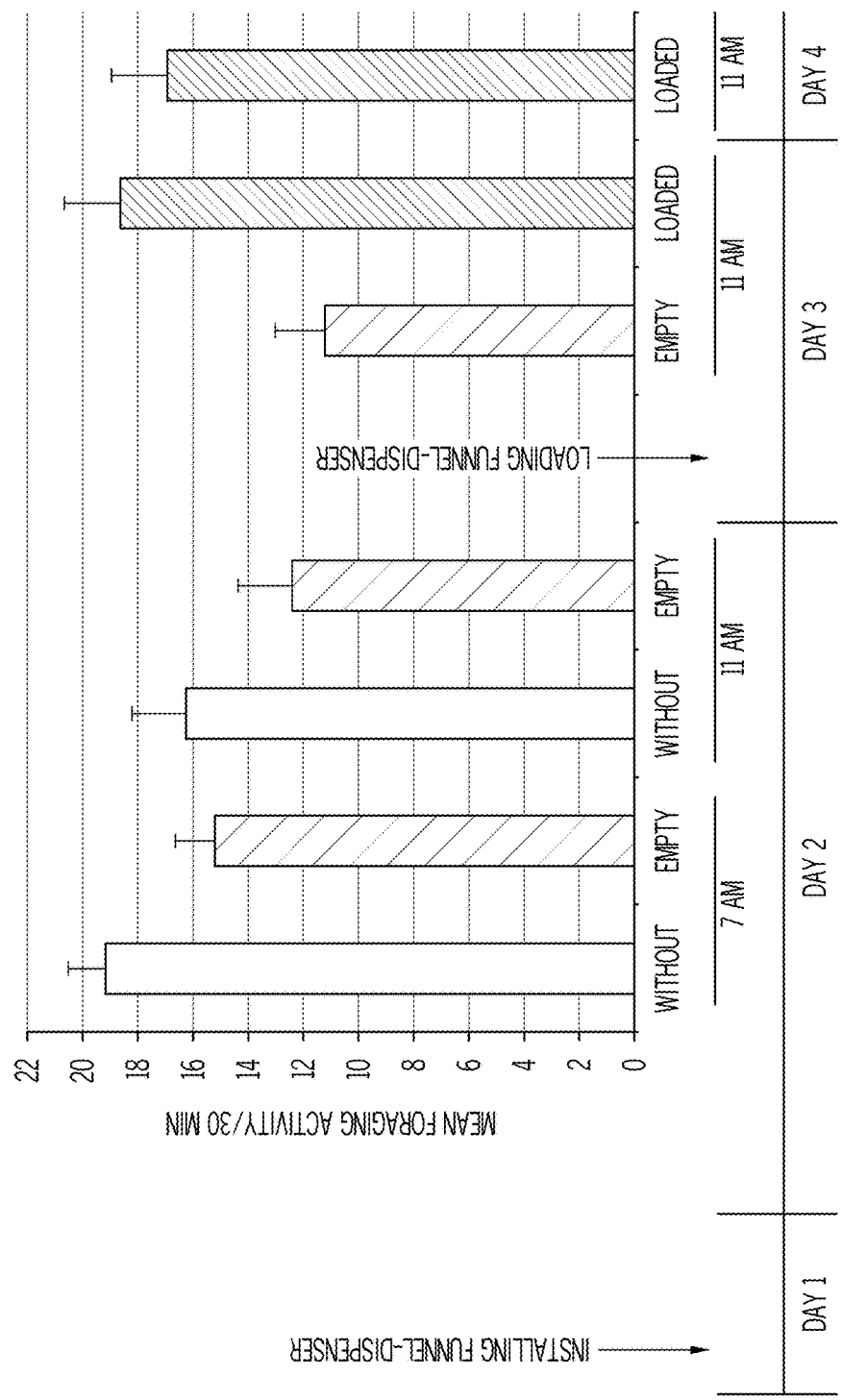
FIG. 3: Impact of the Funnel-dispenser system, when placed before the nest, on bumblebee foraging activity at different time points, before and after loading of the dispenser.

The disseminator device of the present invention solves the problems associated with the aforementioned prior art devices in that it provides:

a high loading capacity for the agent to be disseminated,
it provides an optimal loading of the bees with a short passage time,
it has no influence on the foraging behavior of the bees,
it can be integrated within a hive, and
it is easily accessible for refilling with a minimal disturbance of the nest.

In order to achieve the aforementioned objectives the beehive disseminators of the present inventions, in the examples hereinafter also referred to as dispensers, comprise a chamber to receive the biological control agents or other substances to be disseminated by the bees. As for example shown in the figures, the dispenser chamber is easily accessible for refilling purposes. In order to prevent bees from leaving the hive whilst manipulating the dispenser chamber, the entrance (4) to said chamber is preferably accommodated with means to close the entrance, such as for example a sliding door. Accessibility to the dispenser chamber could for example be realized by means of a removable lid (7), optionally hinged connected to the top grid (0) of the hive. Alternatively, and in case the beehive disseminator of the present invention is integrated into the hive, the top member of the dispenser chamber may consist of the covering grid (0) of the hive. In said instance refilling of the dispenser chamber can be achieved directly through the grid.

As already mentioned hereinbefore, the beehive disseminators of the present invention are characterized in that they comprise one or more entrances and exits that taken together define a unidirectional pathway for the bees through said chamber. When used in conjunction with a hive, this unidirectional pathway is either an entrance pathway for bees entering the hive or an exit pathway for bees leaving the hive. In a preferred embodiment, the unidirectional pathway through the chamber receiving the substance to be disseminated, hereinafter also referred to as the dispenser chamber, is part of the exit pathway for bees leaving the hive.

To realize the unidirectional pathway through the chamber the exits should be such that they allow bees to leave the chamber through the corresponding opening, but prevents bees from entering through said exit opening. As it is known that bees will not enter the hive through a downward directed hole, the means to define a unidirectional pathway through said chamber may consist of one or more downward directed exits at one end of said chamber and one or more entrances at the opposite end of said chamber. The downward directed exit could for example be realized with a cap or hood that fits externally over the exit opening in the side member of said chamber and which has an opening in the downward right-angled plane when compared with the exit opening in the side member of said chamber. Alternatively, the downward directed exit could be realized with a diagonally cut conical tube that fits in and extends to the exterior of the exit opening. The downward directed exits could be made of any material typically used in the manufacture of bee hive dispensers, but in case the exit is actually part of the exit pathway for bees leaving the hive, the material should be light transparent as departing bees are responsive to light entering the chamber.

In an even further alternative embodiment, the means to realize a unidirectional pathway could be realized with a one-way door, such as a trapdoor, swing door or hatch. To encourage the bees in opening the door, and as shown in the examples hereinafter, in a particular embodiment the one-way doors comprise at there base a small opening. There are no particular requirements to the shape of said opening, but its size should be such that it allows bees to identify the opening as a possible escape route, but small enough to prevent them from getting through. As such the width and/or height of this small opening is from about 2 mm to about 3 mm. Again, in case said one-way door is part of the exit pathway, the door should be made of a light transparent, preferable light translucent or perforated material. In case the one-way door is part of an actual entrance to the hive, it preferably consists of an opaque (dark) material. In the latter and to encourage the bees in opening the door, said door may comprise a further opening, such as for example at the base of said door enabling the scent of the hive to enter the second chamber (1).

Different from the art known dispensers, the dispenser chamber of present beehive disseminators is substantially free of obstacles like the cross plates found in the SSP dispenser and the floor level changes found in for example the OP dispenser. The latter influence the passage time in the dispenser, the infiltration of light in the hive and accordingly are likely to influence the foraging behavior of the bees. Compared to the aforementioned disseminators, the dispenser chamber of the present invention only contains means at the floor member of said chamber to immobilize the substance to be disseminated, but without hindering the passage of the bees when walking through the dispenser chamber. As already explained hereinbefore, said means prevent that the bees are able to clear a path through the substance to be disseminated.

The substance to be disseminated can be any substance that is not pathogenic to the bees, including pollen; plant protection products such as agrochemicals; biocontrol agents such as for example virus, bacteria, fungi, rickettsia, nematode, eggs of beneficial mites or insects, or beneficial mites or insects; fertilizers; or preparations containing plant hormones, etc. While it is well known in the art that bumblebee hives without dispenser and disseminated substance included therein are useful for pollination of certain plants, the disseminated substance as used in the invention is intended to deliver an added utility to the plant (preferably via the flowers) visited by the bumblebees such as reducing certain pest and disease problems, pollination (in particular cross-pollination) or better or altered development of the flower or the plant.

Said substances can be used as such, or in the form of a formulation, including combinations of the aforementioned substances. In a particular embodiment, the substance is in a liquid or powdered formulated, more in particular the formulation is a powdered formulation, e.g. using a powdered carrier. The powdered carrier can be a starch such as corn, starch, talc, dust derived from crushed hulls of nuts, clay dust, or mixtures thereof.

Any material to prevent unwanted displacement of the powdered substance/formulation can be used in the dispenser chamber of the present invention. In a particular embodiment said means are an integrated part of the floor member of the dispenser chamber, for example in case an abrasive material is used to make the floor member of said chamber. Examples of such an abrasive material include rough-cut wood that is naturally textured or plastic having a non-skid surface, e.g. having a scribed surface or a plurality of ridges. In an even further embodiment said integrated means to prevent the unwanted displacement of the substance consists of a mesh, or a plurality of edges, ribs, ridges, bumps, etc. In a particular embodiment the integrated means to prevent the unwanted displacement of the substance consist of a series of slopes separated by a shallow edge. The inclination of said slopes is preferably in the same directional axis as the exit pathway through said chamber. In said particular embodiment the bees will dip a number of times through the substance to be disseminated, resulting in a high load over a short distance. Alternatively, the floor member of the dispenser chamber is covered with a removable material, and are for example selected from one or more of a mesh screen, e.g. of welded wire; cheesecloth; sponge; brushes; ribbed paper; a series of slopes separated by a shallow edge, a halfpipe, or ribbed paper. In a particular embodiment said means are removable and may consist of a combination of any one of the aforementioned examples. In a preferred embodiment the means to immobilize the substance to be disseminated consists of a removable halfpipe comprising two or more of edges, ribs, ridges, bumps, etc (such as for example represented in FIG. 9E). Blocking members to retain said material at a fixed position in the dispenser chamber may also be present. In any one of the aforementioned embodiments, the means to prevent the unwanted displacement of the substance will cause an automatic and even distribution of the substance, even after a bee crossed the dispenser chamber. For example, in case the means to prevent unwanted displacement of the substance consists of ribbed paper, the ribs are preferentially in the longitudinal direction of the dispenser chamber.

As provided in more detail in the examples hereinafter, in a particular embodiment the beehive disseminator of the present invention is built into an actual beehive. One of said integrated beehive disseminators will consist of a dispenser chamber as described hereinbefore, wherein the unidirectional exit(s) of the dispenser chamber communicate with the exit(s) of the hive and the entrance(s) of the dispenser chamber is in direct contact with the interior of the hive. To improve the accessibility of the integrated dispenser chamber for bees willing to leave the hive, the hive optionally comprises means that allow bees to crawl from the hive up and into the dispenser chamber, such as for example a wire, stick, mesh, ladder, etc . . . , that extends from the entrance (4) of the dispenser chamber into the hive. It is accordingly an object of the present invention to provide a beehive disseminator of the present invention further characterized in that the dispenser chamber comprises at its entrance (4) means that allow bees to crawl from the hive up and into the dispenser chamber. Said means that allow bees to crawl from the hive up and into the dispenser chamber, are for example attached to the dispenser chamber, or to the top grid of the hive.

As already mentioned hereinbefore, since bees looking to exit are responsive to light entering the hive, it is of importance that sufficient light enters the dispenser chamber. Further to the use of transparent or perforated downwardly directed exit means (supra), the light in the dispenser chamber can be enhanced through the use of a transparent or perforated side member at the exit of the dispenser chamber. In said embodiment wherein the beehive disseminator of the present invention is built into an actual beehive, the transparent or perforated side member at the exit of the dispenser chamber should either be in contact with a corresponding window or opening in the actual beehive. It is accordingly an object of the present invention to provide a beehive disseminator of the present invention further characterized in that the dispenser chamber comprises a transparent or perforated side member at the exit of said chamber.

To assure that bees leaving the hive will pass through the dispenser chamber and not escape via the beehive entrance, the latter should comprise similar means as the means used for the unidirectional exits mentioned above. In a particular embodiment the hive entrance hole will comprise an inwardly directed conical tube, optionally a diagonally cut conical tube. To prevent light penetration, which may attract departing bees, the means to realize the unidirectional entrance should be made of a light opaque material. In an even further alternative embodiment, the beehive entrance could be realized with a one-way door, such as a trapdoor, swing door or hatch. As for the diagonally cut conical tube above, the one-way door at the entrance to the hive, is preferably made of a light opaque material. Where bees leaving the hive are responsive to light, bees entering the hive are attracted by the scent of the hive. Thus in case the means to realize the unidirectional entrance consist of a one-way door, the latter may comprise a further opening, such as for example at the base of said door enabling the scent of the hive to leave and attract the entering bees.

Thus in a particular embodiment, the present invention provides a hive comprising a dispenser chamber as described hereinbefore, wherein;

the unidirectional exit(s) of said chamber communicate with the hive exit(s);

the entrance(s) of said chamber are in direct contact with the interior of the hive; and wherein the hive entrance comprises means to realize a unidirectional entrance.

As already mentioned hereinbefore, the means to realize a unidirectional entrance could be similar to the means to realize the unidirectional exit, but alternatively the hive entrance will communicate with the entrance of a second chamber. As for the dispenser chamber, the exit opening(s) in said second chamber should be such that taken together with the entrance they define a unidirectional pathway for the bees through said chamber. When integrated in the hive, the exit opening of said second chamber is in direct contact with the interior of the hive and comprises means to prevent bees from entering said second chamber through said exit opening. In a particular embodiment, said means consist of an inwardly directed conical tube, optionally a diagonally cut conical tube. In an alternative embodiment said means consist of a one-way door, such as a trapdoor, swing door or hatch that opens in a single direction. In an even further embodiment the integrated entrance chamber (the second chamber (1)) may comprise at its unidirectional exit that is in direct communication the interior of the hive, means that allow bees to crawl from the entrance chamber down and into the hive, such as for example a wire, stick, mesh, ladder, etc . . . .

Where the length of the exit pathway is important to realize an optimal load of the bees with the substance to be disseminated, the length of the entrance pathway is of less importance. Consequently, compared to the length of the dispenser chamber, the second chamber may have the same length but could be shorter as well. To further reduce light penetration through the hive entrance pathway, the length of the second chamber should be about 5, 10, 15 cm or more. To benefit from the scent of the hive in attracting entering bees, the second chamber could be made of a mesh, or comprise perforations at its base and side member(s) in communication with the hive. To allow the development of a scent trail in the second chamber, the latter may comprise a carrier material covering the base (floor) of said chamber, such as for example a piece of cardboard, or rough-cut wood. Again and similar to the unidirectional entrance mentioned hereinbefore, in case the unidirectional exit of said second chamber consists of a one-way door, the latter may comprise a further opening, such as for example at the base of said door enabling the scent of the hive to enter said chamber and attract the entering bees.

Again, but for the length of the exit pathway, there are no particular limitations to the shape of the chambers as shown in the examples herein below. Given the ability to integrate the chambers into a hive, limitations in the height, width and length are typically set by the dimensions of the hive. Width of the chambers is typically from about 2.0 to 15.0 cm, with the dispenser chamber on average from about 5.0 to about 15.0 cm and the second chamber on average from about 2.0 to about 5.0 cm. The height of the chambers should be such that it prevents bees from flying and is typically from about 1.0 to about 15.0 cm with on average a height of about 3.0 to 4.0 cm. Not to become an obstacle for bees entering or leaving the chambers, the openings should be close to the floor members and are positioned up to about 0.5 cm above said floor members, with diameters ranging from the width of the chambers down to about 1.0 cm.

The two chambers as described herein could be independent and separate chambers, but preferably taken together form a single housing such as for example provided in the different embodiments herein below. As such the housing can be used in or outside the hive. In the latter case the entrance(s) of the dispenser chamber and the exit(s) of the second chamber will comprise means to communicate with the exit(s), respective entrance(s) of the hive.

The means to communicate with the hive entrance or exit are typically selected from flexible tubes, rigid tubes, swing doors or conical tubes.

This invention will be better understood by reference to the Experimental Details that follow, but those skilled in the art will readily appreciate that these are only illustrative of the invention as described more fully in the claims that follow thereafter. Additionally, throughout this application, various publications are cited. The disclosure of these publications is hereby incorporated by reference into this application to describe more fully the state of the art to which this invention pertains.

EXAMPLES

In all of the following examples different embodiments of the beehive disseminators are presented and tested for their efficacy in distributing microbiological control agents (MCA) using the bumblebee *Bombus terrestris*.

As provided in more detail in the examples hereinafter, efficacy of the beehive disseminators, i.e. dispensers was assessed by;

determining the loading of the bumblebees with MCA, by scoring the CFU that could be recovered from the bees; determining the impact of the dispenser on foraging intensity, by counting in and out frequency for 30 minutes at different time points during the day; and determining the amount of MCA dispersed in the flowers when tested under practical conditions in a closed greenhouse. The amount of MCA dispersed in the flowers was scored as the CFU that could be recovered thereof.

Example 1

Funnel-dispenser

In all of the experiments with the F-dispenser the MCA consists of seeds/propagules of the Fungi strains *Trichoderma atroviride* and *Hypocrea parapilulifera* at a minimum concentration of 1,000,000 CFU (Colony Forming Units)/gram. This MCA is for example available under the Commercial product name BINAB® T Vector (Bio-Innovation AB, Sweden). However, any control agent, which does not interfere with the bees to perform normally, could be used.

Funnel-dispenser Design

The Funnel-dispenser (F-dispenser) has the following characteristics (FIG. 1):

- It is a two-way dispenser with a trapezium basis, made of 3 mm thick PVC, with a separated exit and entrance compartment ((2) and (1), respectively)
- The trapezium basis has a width of 7.2 cm to 18 cm
- Compartment (2), is filled with the MCA, is 5.3 cm high, from about 7.0 to 14.0 cm wide and from about 20-30 cm long. This compartment contains one opening (4) that is connected with the nest via a short plastic tube with a bumblebee-in-closer and 3 exit openings (5), with a bumblebee-in-closer. Bumblebee-in-closers are used to prevent that bumblebees will return to the nest via the wrong opening
- The exit openings are placed as closely as possible to the entrance opening, since it was observed that bumblebees leaving the dispenser via an exit opening located far from the entrance opening spend more time to find the correct entrance opening
- Compartment (1) (Length about 20-30 cm×Width about 3.0 cm×Height 5.3 cm) has two openings, one is connected with the nest (3) via a short plastic tube, with a bumblebee in-closer at the inside of the hive to prevent bumblebees from exiting the nest via the wrong opening and the other is the entrance opening. The latter opening (6) is marked at the outside with a blue color to attract the bumblebees for going in
- To avoid movement of the powder as a consequence of bumblebee movement, a mesh is put on the bottom of the dispenser.

Funnel-dispenser Efficiency for Bumblebee Loading

Figure 4:
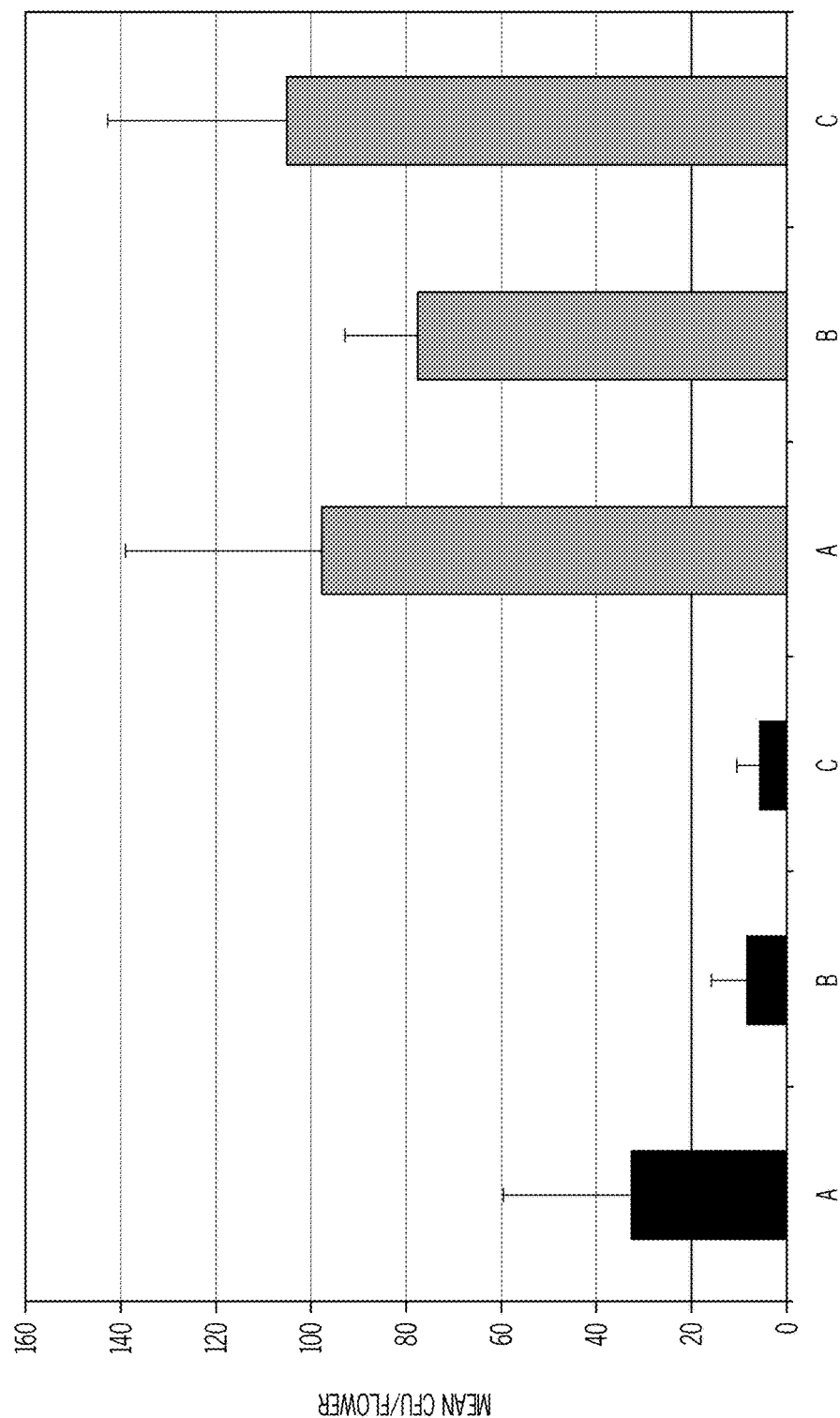
FIG. 4: Comparison of the F-dispenser with the modified SSP-dispenser in a closed greenhouse on the amount of deposition of MCA on flowers. Mean number of CFU's recovered per zone (A-B-C) per type of dispenser [modified SSP-dispenser (black bars) or F-dispenser (grey bars)] during a three-week sampling, with samples taken once a week.
Figure 5B:
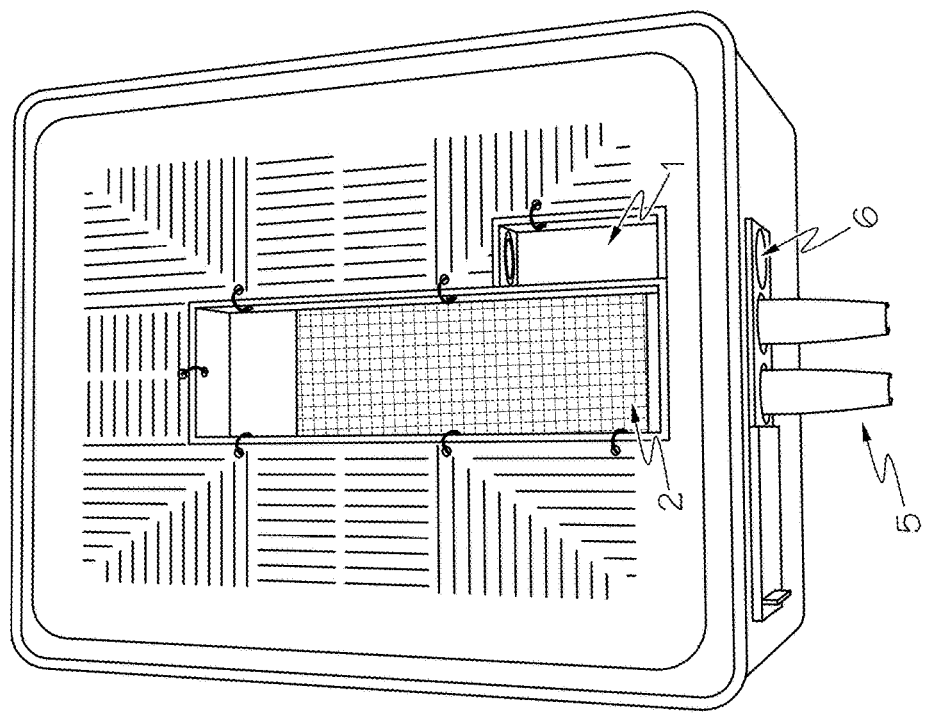
FIG. 5: Rectangular-dispenser, built-in in a bumblebee hive, A: top view with closed lid, B: top view with open lid, C: side view, D: front view. 1: entrance compartment, 2: rectangular-shaped exit compartment, 3: bumblebee in-closer connecting the entrance compartment with the bee hive, 4: connection of the exit compartment with the bee hive, 5: bumblebee in-closer exit openings, 6: entrance opening, 7: lid of the dispenser.
Figure 5A:
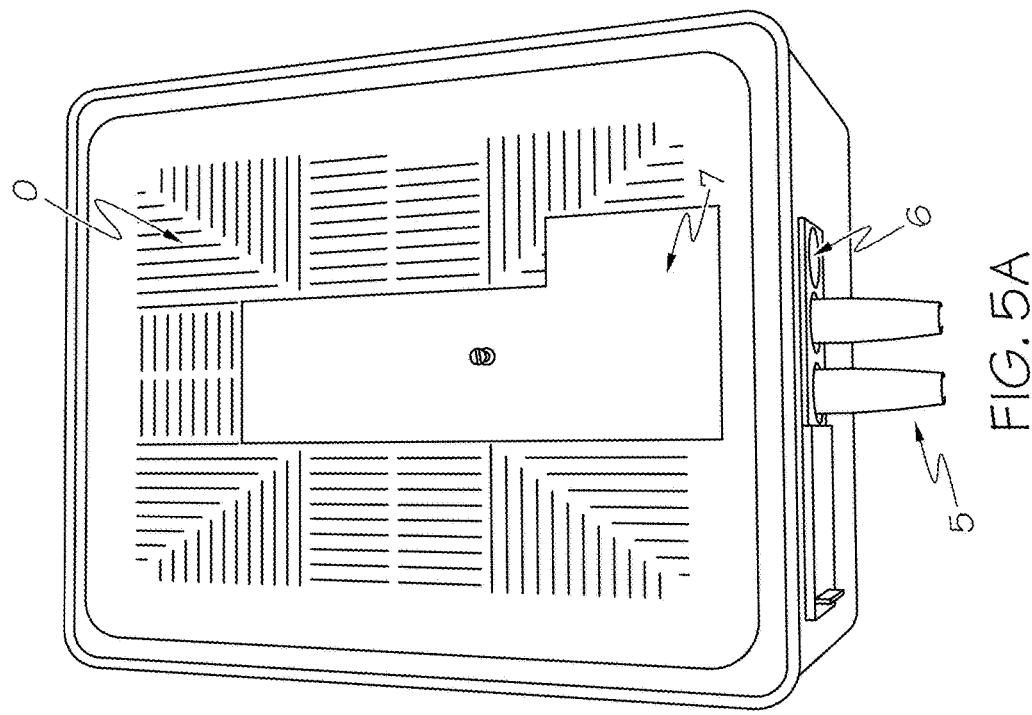
Figure 5C:
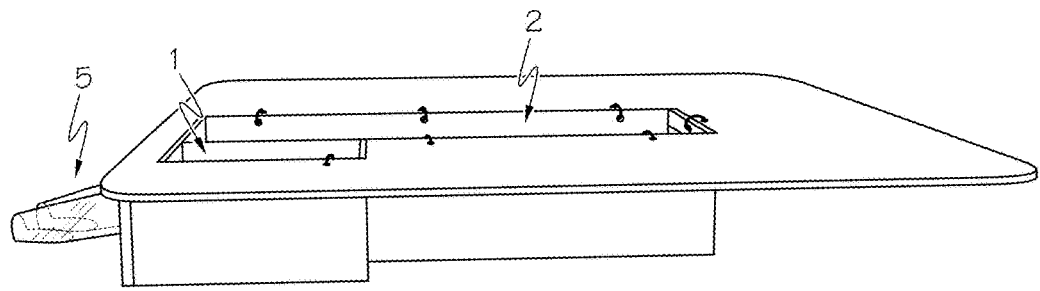
Figure 5D:
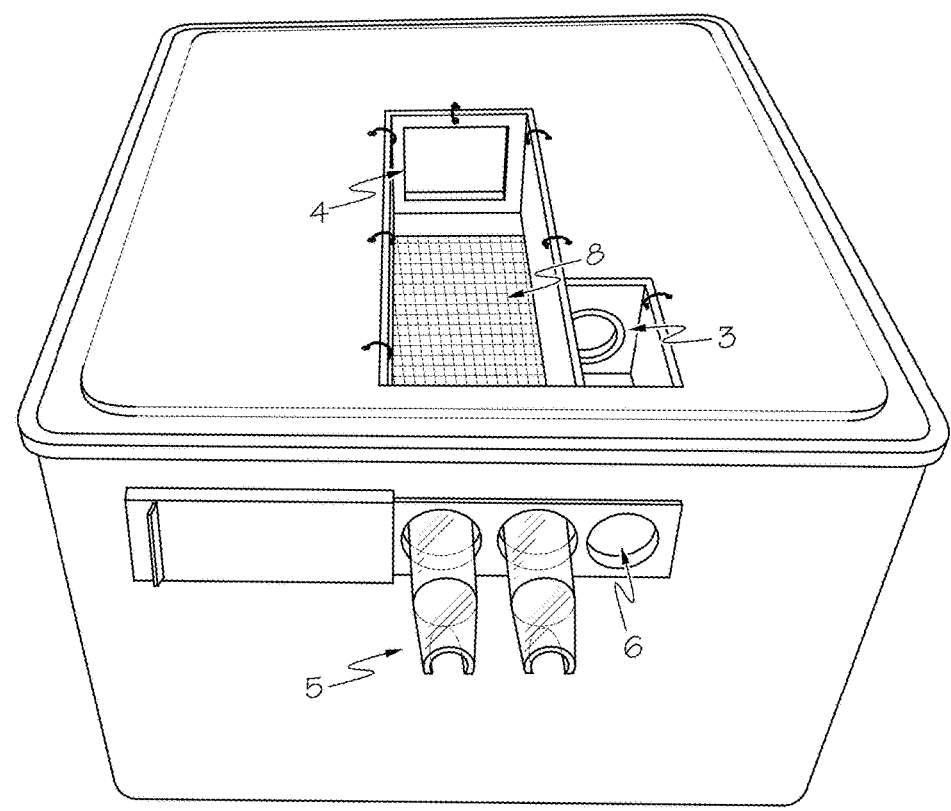
Figure 6:
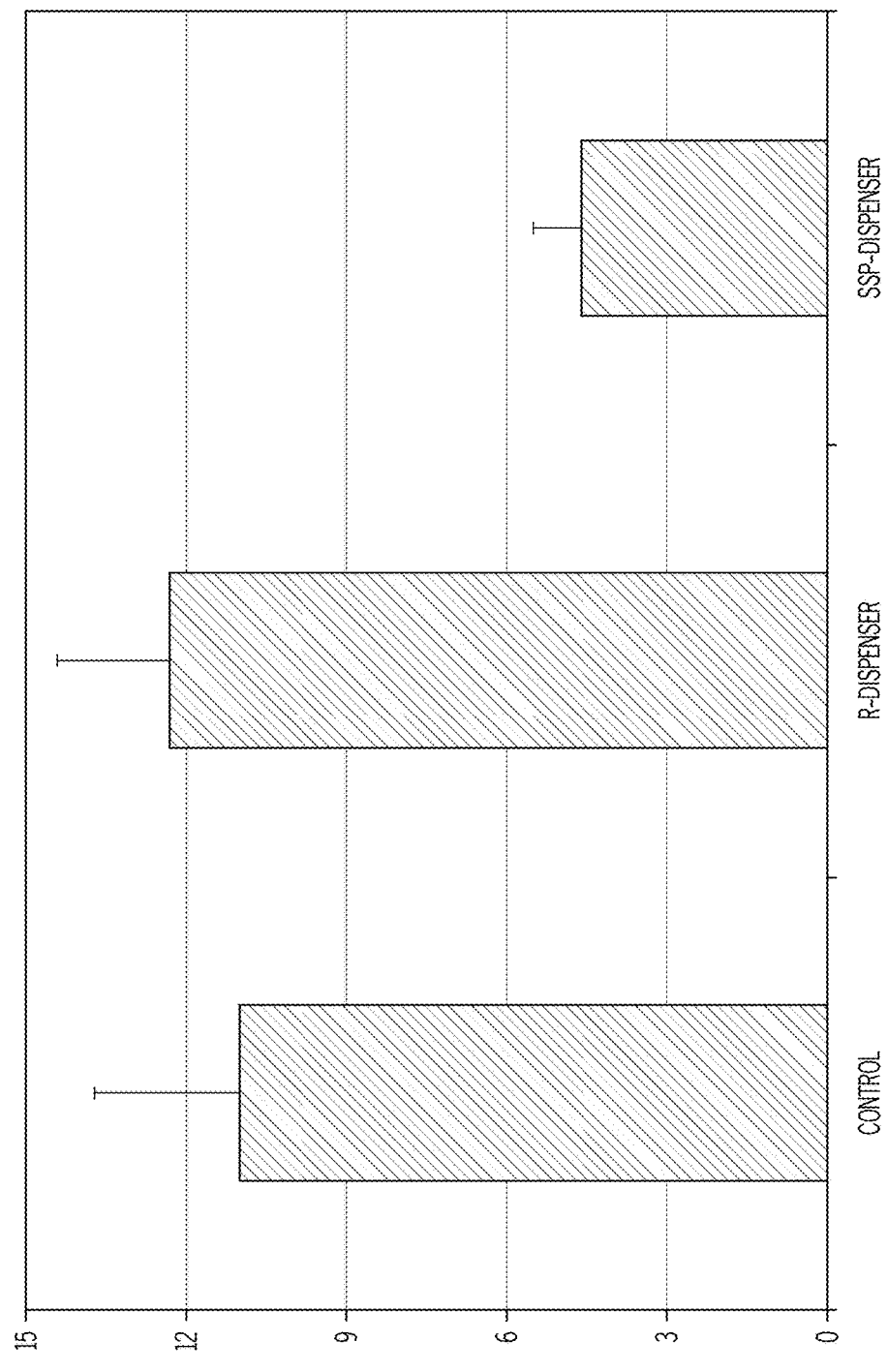
FIG. 6: Comparison of the R-dispenser and the SSP-dispenser on foraging activity of bumblebees. Mean foraging activity per 30 min was measured at 3 consecutive days and 2 different time points per day for 3 beehives without dispenser (control), 3 beehives with the R-dispenser and 3 beehives with an S-dispenser.
Figure 7:
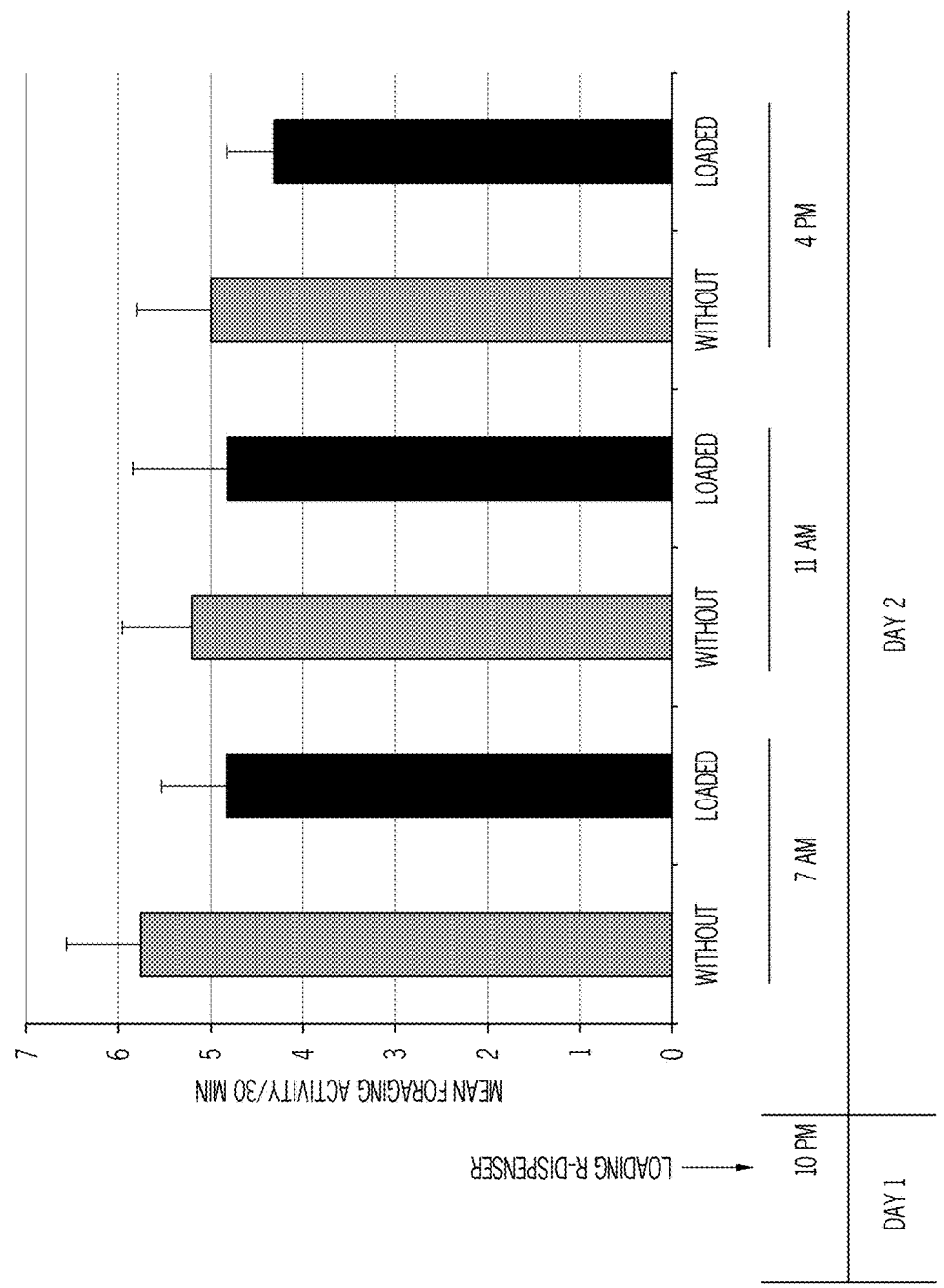
FIG. 7: Effect of loading of the R-dispenser on foraging activity of bumblebees. Mean foraging activity per 30 min measured at 3 different time points (7 AM, 11 AM and 4 PM) the day after loading of the R-dispenser. Loaded R-dispenser (black bars), empty R-dispenser (grey bars).
Figure 8:
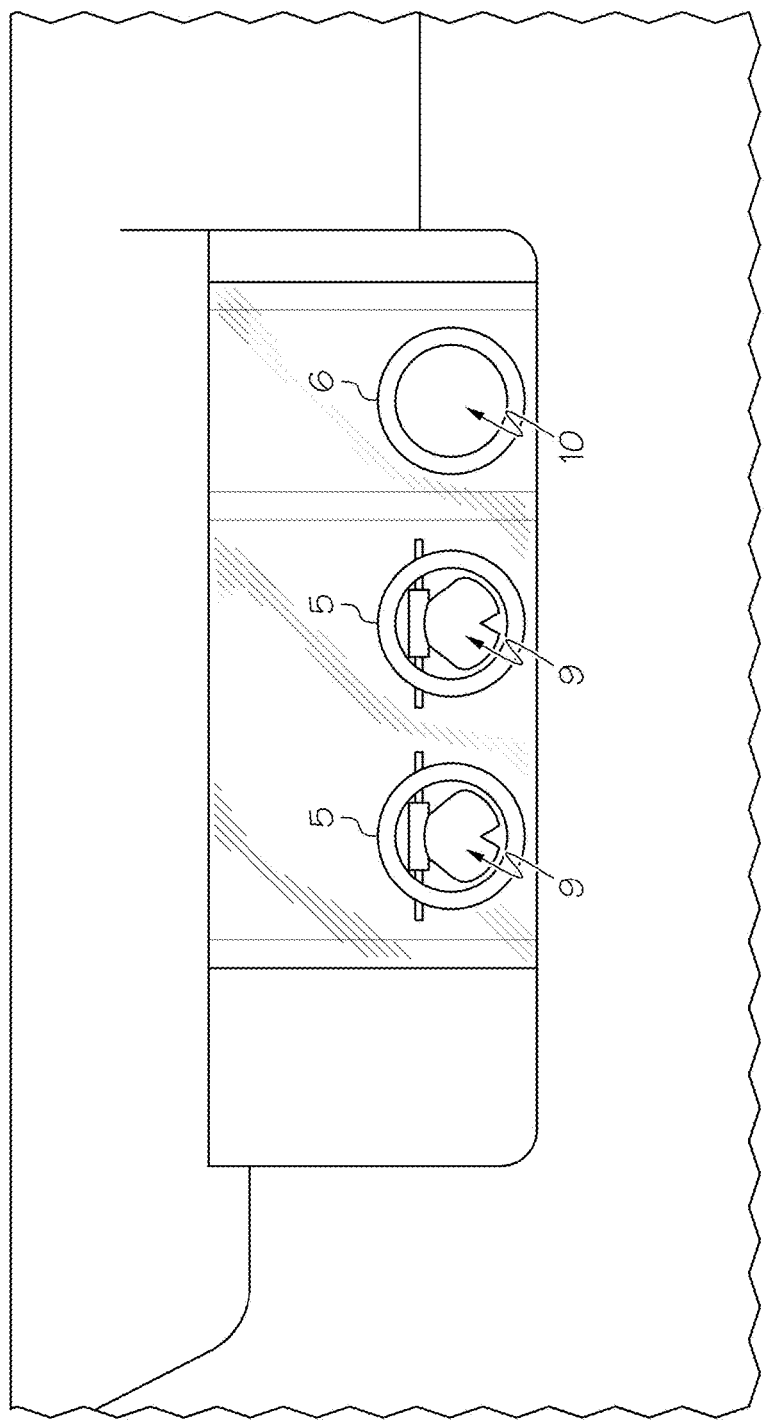
FIG. 8: R-dispenser, built into a in a bumblebee hive, showing bumblebee in-closer exit openings (5) having a one-way door (9), and an entrance opening framed with a visual mark (10) (i.e. a blue mark).
Figure 9A:
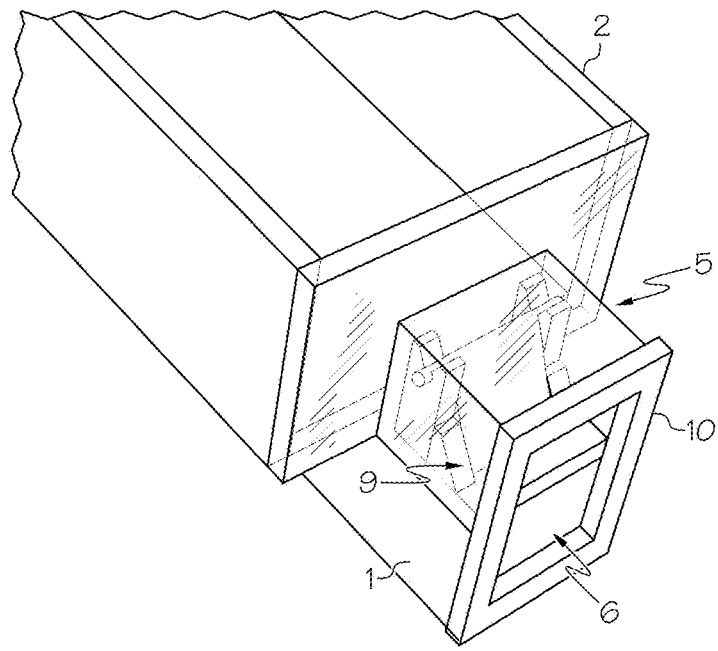
FIG. 9: Superimposed Dispenser (S-Dispenser) A: Top Front View B: Bottom Rear View C: Side View D: S-Dispenser, built into a in a bumblebee hive, showing the superimposed exit (5) and entrance (6) framed with a visual mark (10). View E: representation of a possible embodiment of the means (8) to immobilize the substance to be disseminated in the form of a half pipe having a plurality of ridges.
Figure 9B:
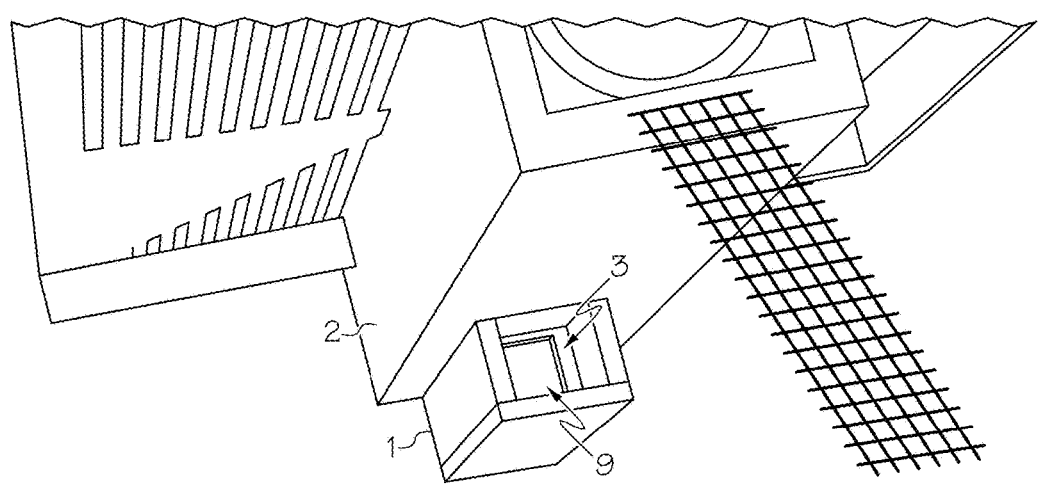
Figure 9C:
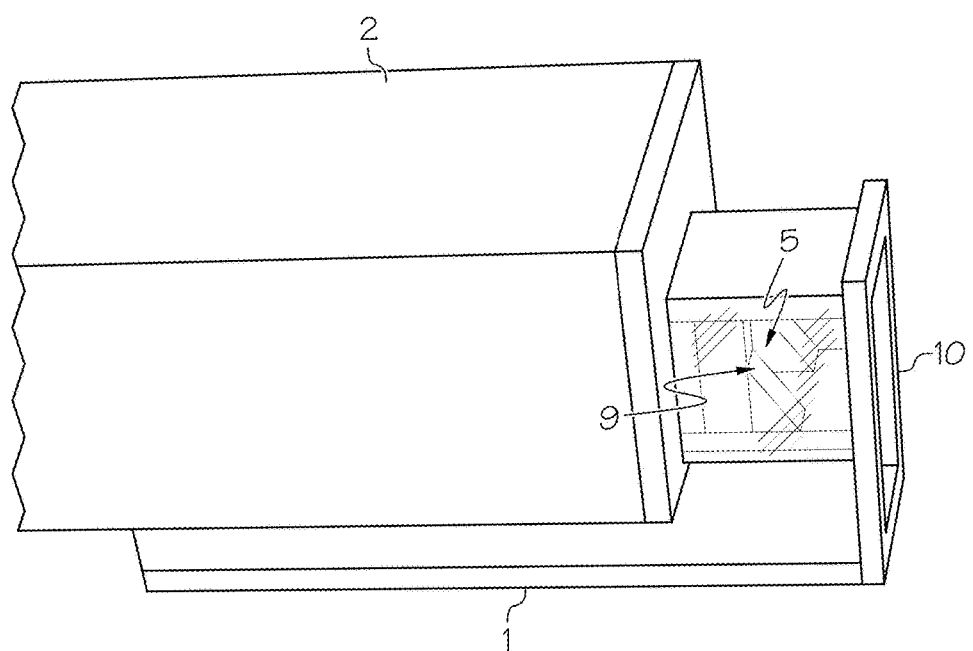
Figure 9D:
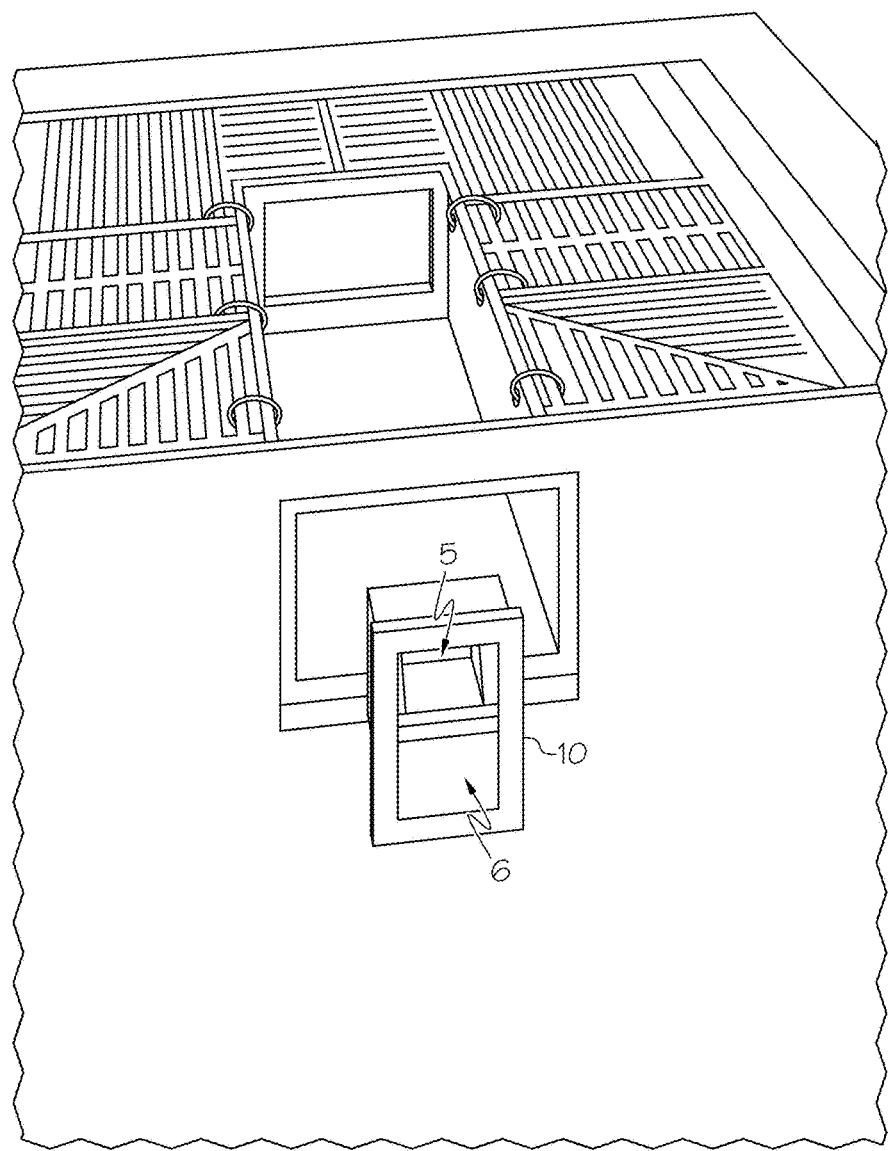
Figure 9E:
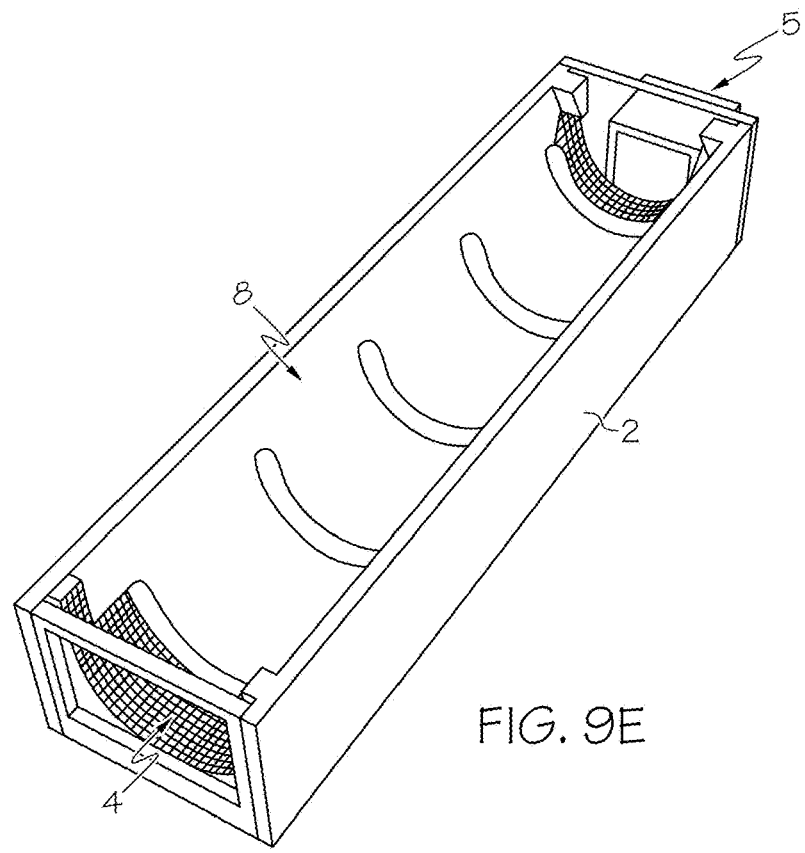

To determine the optimal minimal length of the Funnel-dispenser, to obtain an optimal loading of the bumblebee body, we drew lines on the dispenser (of 25 cm in length) at 5, 10, 15, 20 and 25 cm. The dispenser was filled with BINAB® T Vector. Bumblebees of the same age and size were kept individually in a falcon tube covered with aluminum foil for darkness. Then the falcon tube was connected with the dispenser, and the bumblebee workers were allowed to walk through the dispenser. The workers were captured at different distances after 5, 10, 15, 20 or 25 cm of walking through the dispenser under complete darkness (red light) to avoid disturbance of the worker walking behavior by the presence of light. After capturing, bees were killed, and the amount of CFU present on their body was analyzed. Thereto for each distance, 10 bumblebees were shaken in a physiological solution at 200 rpm during 60 minutes. The amount of CFU was analyzed by plating out a series of dilutions of the obtained solution on selective media and for each dilution 4 plates were used. Petriplates were incubated at room temperature and after 36 hrs individual colonies were scored. The experiment was repeated three times.

As shown in FIG. 2, the best loading was obtained when the bees walked for 20 or 25 cm through the dispenser. The data suggest that the loading reached its maximum/saturated loading with 20 and 25 cm of walking through the dispenser. At lower distances a significantly ($p<0.05$) lower amount of CFU was recovered.

Furthermore, the efficiency of the F-dispenser for bumblebee loading was compared to that of the previously described SSP-dispenser. Thereto an F-dispenser, in which the compartment filed with the MCA was 25 cm long, was used. The F-dispenser appeared to be much more effective in bumblebee loading, as the mean CFU/bee (433413±62780) was 10 times higher than for the SSP-dispenser (49421±3499). The mean body surface area of the bees used in both dispensers was comparable: 362.8±19.6 $mm^2$ for the SSP-dispenser and 356.7±59.0 $mm^2$, indicating that the difference in CFU/bee is due to a higher efficiency of the R-dispenser in bumblebee loading.

Effect of Funnel-dispenser on Foraging of the Bumblebees

The purpose of this experiment was to test whether attaching the Funnel-dispenser in front of a bumblebee hive, affects the foraging activity of bumblebees in five different nests. To determine the period when bees are most active, bumblebee activity (in/out of the nests) was counted during 30-minute intervals between 7 AM-9 AM, 11 AM-1 PM, 4 PM-6 PM and 7 PM-9 PM. Although there were no significant differences in bumblebee activity between the different time points, the highest activity was observed during the 7 AM-9 AM and 11 AM-1 PM intervals (data not shown). Therefore, it was decided for the further analysis to work with 7 AM and 11 AM.

Next, bumblebee activity was determined at the time points 7 AM and 11 AM in hives with and without an empty Funnel-dispenser, placed in front of the hive. Measurement was done the day after placement of the dispenser. As shown in FIG. 5, although bumblebee activity was slightly lower in nests with an F-dispenser, this effect was not significant, indicating that the F-dispenser does not significantly affect bumblebee activity. The next morning (7-9 AM), the dispenser was loaded with BINAB® T Vector powder and the effect on bumblebee activity was measured at 11 AM and 24 hours later, again at 11 AM (FIG. 3). Interestingly, bumblebee activity was significantly higher, 1 hr after loading of the dispenser as compared with an empty dispenser (FIG. 3), even being comparable to the bumblebee activity without the F-dispenser at 11 AM. Furthermore, a comparable level of activity was also observed 24 hours after loading of the F-dispenser.

Evaluation of the Funnel-dispenser in a Closed Greenhouse

To evaluate the efficiency of the F-dispenser, we performed an experiment under practical conditions in a closed greenhouse (controlled temperature and humidity) with strawberries. In both the F-dispenser (0.08 $g/cm^2$) as well as in a modified SSP dispenser (0.13 $g/cm^2$) (separated entrance and exit openings) the BINAB® T Vector was used as to be dispersed agent. At weekly basis the powder level in the dispensers was scored and if necessary refilled. In total three greenhouses were used: one for each dispenser and one control greenhouse where no MCA was used. The temperature and relative humidity were followed with data loggers.

To determine how far bumblebee workers forage to inoculate flowers with MCAs, we marked on the ground floor of each greenhouse three circles with the bumblebee nest in the centre and with a diameter of 8 m (zone A), 18 m (zone B) and >18 m (zone C=the rest of the greenhouse). In each zone, 20 flowers were collected and put individually in a falcon tube. This was done on a weekly base during 3 weeks. Per falcon tube 50 ml of physiological solution was added to the flowers, and these were shaken at 120 rpm during 60 min. A series of dilutions (1/1, 1/5, 1/10-1/100,000) was prepared with the obtained solution and plated out on TSM (William et al., *Applied and Environmental Microbiology,* 2003, 69, pg. 4190-4191). For each concentration 4 plates were used. After 36 hrs of incubation at room temperatures, the numbers of colonies were scored.

Interestingly, more CFUs were scored per zone with use of the Funnel-dispenser compared to the modified SSP-system (FIG. 4). Between the three zones A, B and C, there were no significant differences: equal amounts of CFU were recovered in the flowers.

In summary, our results clearly indicate that the F-dispenser does not significantly affect bumblebee activity and that it scores better in MCA loading on the bumblebees and in MCA deposition in flowers, compared to the SSP dispenser.

Example 2

Rectangular-dispenser

In the experiments with the R-dispenser the MCA consists of

- seeds/propagules of the Fungi strains *Trichoderma atroviride* and *Hypocrea parapilulifera* at a minimum concentration of 1,000,000 CFU (Colony Forming Units)/gram. This MCA is for example available under the Commercial product name BINAB® T Vector (Bio-Innovation AB, Sweden), or
- seeds/propagules of the Fungi strain *Gliocladium catenulatum* J1446 at a minimum concentration of 10,000,000 CFU (Colony Forming Units)/gram. This MCA is for example available under the Commercial product name Prestop Mix® (Verdera Oy, Finland).

However, any control agent, which does not interfere with the bees to perform normally, could be used.

Rectangular-dispenser Design

The Rectangular-dispenser (R-dispenser) has the following characteristics (FIG. 5):

- It is a two-way dispenser with a rectangular basis, made of 3 mm thick PVC, with a separated exit and entrance compartment ((2) and (1), respectively)
- The rectangular basis has a width ranging of about 2.5 to about 15.0 cm, preferentially a width of about 10.0 cm.
- Compartment (2), is filled with the MCA, is about 4.0 cm high, 5.0 cm wide and 20-25 cm long. This compartment contains one opening (4) that is in direct contact with the nest and 2 exit openings (5), with a bumblebee-in-closer. Bumblebee-in-closers are used to prevent that bumblebees will return to the nest via the wrong opening
- The exit openings are placed as closely as possible to the entrance opening, since it was observed that bumblebees leaving the dispenser via an exit opening located far from the entrance opening spend more time to find the correct entrance opening
- Compartment (1) (Length about 8.0 cm×Width about 2.5 cm×Height 4.0 cm) has two openings, one is in direct communication with the nest (3) and comprises a bumblebee in-closer, to prevent bumblebees from exiting the nest via the wrong opening and the other is in communication with the entrance opening (6) of the hive through a short plastic tube. The latter opening is marked at the outside with a blue color to attract the bees for going in.
- To avoid movement of the powder, as a consequence of bumblebee movement, a mesh is put on the bottom of the dispenser.

R-dispenser Efficiency for Bumblebee Loading

The efficiency of the R-dispenser for bumblebee loading was investigated. Hereto the dispenser, filled with Prestop Mix® (0.11 g/cm$^2$), was connected to a bumblebee nest with two grey plastic tubes. In this nest, pollen was removed one day before connection, to stimulate bees to leave the dispenser and search for food. Then a falcon tube was connected in an angle of 45 degrees on the entrance/exit opening to capture the worker bees that left the dispenser. In total 10 bumblebees were captured and killed. Thereafter the bumblebees were shaken in a physiological solution at 200 rpm during 60 minutes. The amount of CFU was analyzed by plating out a series of dilutions of the obtained solution on selective media (PDA) and for each dilution 4 plates were used. The Petri dishes were incubated at room temperature and after 36 hrs individual colonies were scored. The numbers of CFU recovered on each body were calculated in respect to the surface area. The experiment was repeated twice.

The mean CFU load per bumblebee worker was 1083150±3700 CFU and the mean body surface per bumblebee worker was 361.0±18.0 mm$^2$. These data indicate that the R-dispenser is even about 3.5 times more efficient for bumblebee loading compared to the F-dispenser with a travel length of 25 cm (see FIG. 2).

Evaluation of the Effect of the R-dispenser on Foraging Activity in a Closed Greenhouse The purpose of this experiment was to compare the effect of the R-dispenser and the SSP-dispenser, both unloaded, on the foraging activity of bees in a sweet pepper greenhouse. For each dispenser type, 3 bumblebee hives were used, each consisting of one queen and 50 workers. The control group consisted of regular bumblebee hives. At day zero the two dispensers were connected to (for SSP-dispenser) or in (for R-dispenser) the regular hives. After 3 days, countings were done at 9 AM and 4 PM. Countings were repeated at day 4 and day 5 at 9 AM and 4 PM. Data were analyzed for normal distribution with a Kolmogorov-Smirnov test.

The results followed a normal distribution. The foraging activity was not significantly different between 9 AM and 4 PM (data not shown). The mean foraging activity per 30 minutes for each dispenser type is shown in FIG. 6. These results indicate that the foraging activity per 30-minute intervals was significantly ($p<0.05$) different between the R-dispenser and the SSP-dispenser. Moreover, no significant effect was seen on the mean foraging intensity per 30 minutes between the controls and the nests containing an R-dispenser.

Evaluation of the Effect of Loading the R-dispenser on Foraging Activity

The purpose of this experiment was to test whether loading the R-dispenser, affects the foraging activity of bees. Thereto 10 nests containing an R-dispenser were used. At the evening of the next day (10 PM) the R-dispensers in five nests were loaded with 10 g Binab® T-vector and 5 stayed empty. The next morning counting was done at 7 AM, 11 AM and 4 PM to determine the effect of a dispenser loaded with powder and without powder. Any reduction in activity was attributed to the effect of the powder. Data were analyzed for normal distribution with a Kolmogorov-Smirnov test. Then significance between the nests was determined with an independent sample t-test.

The obtained results followed a normal distribution. We evaluated what the impact was of a loaded dispenser on the foraging intensity. For the five nests with an empty R-dispenser, the response was not significantly different at 7 AM, 11 AM and 4 PM as compared with the five nests containing a loaded R-dispenser (FIG. 7).

In summary, our results clearly indicate that the R-dispenser does not significantly affect bumblebee activity and that it scores very good in MCA loading on the bumblebees.

Example 3

Figure 10:
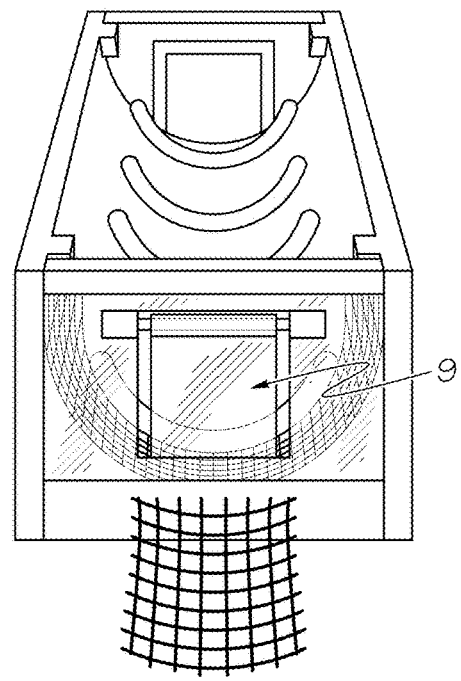
FIG. 10: 3 valves S-dispenser, a modified S-dispenser featuring a third valve between the dispenser chamber and the nest.

Evaluation of the Effect of the Superimposed (S)-dispenser on Foraging Activity in Outside Conditions The purpose of this experiment was to assess the effect of the presence of the filled S-dispenser, on the foraging activity of bees in outside conditions. Also, a modified S-dispenser was tested. This, called '3 valves S-dispenser' differed from the S-dispenser by featuring a third valve between the dispenser chamber and the nest (see FIG. 10), to preclude loaded bees to return to the nest. Each dispenser type was tested in three replicates, each containing one queen and about 50 workers. The control group consisted of 3 regular bumblebee hives. The hives were placed in a row outside alternatingly. At day zero the dispensers were mounted in regular hives and filled with Maïzena to mimic the presence of a powder formulation. After 5 days, the dispensers were refilled and countings of 30 minutes were done at 10 AM and 2:30 PM. Countings were repeated at day 5, 7 and 9 at 10 AM and 2:30 PM. Averages and standard errors were calculated.

Figure 11:
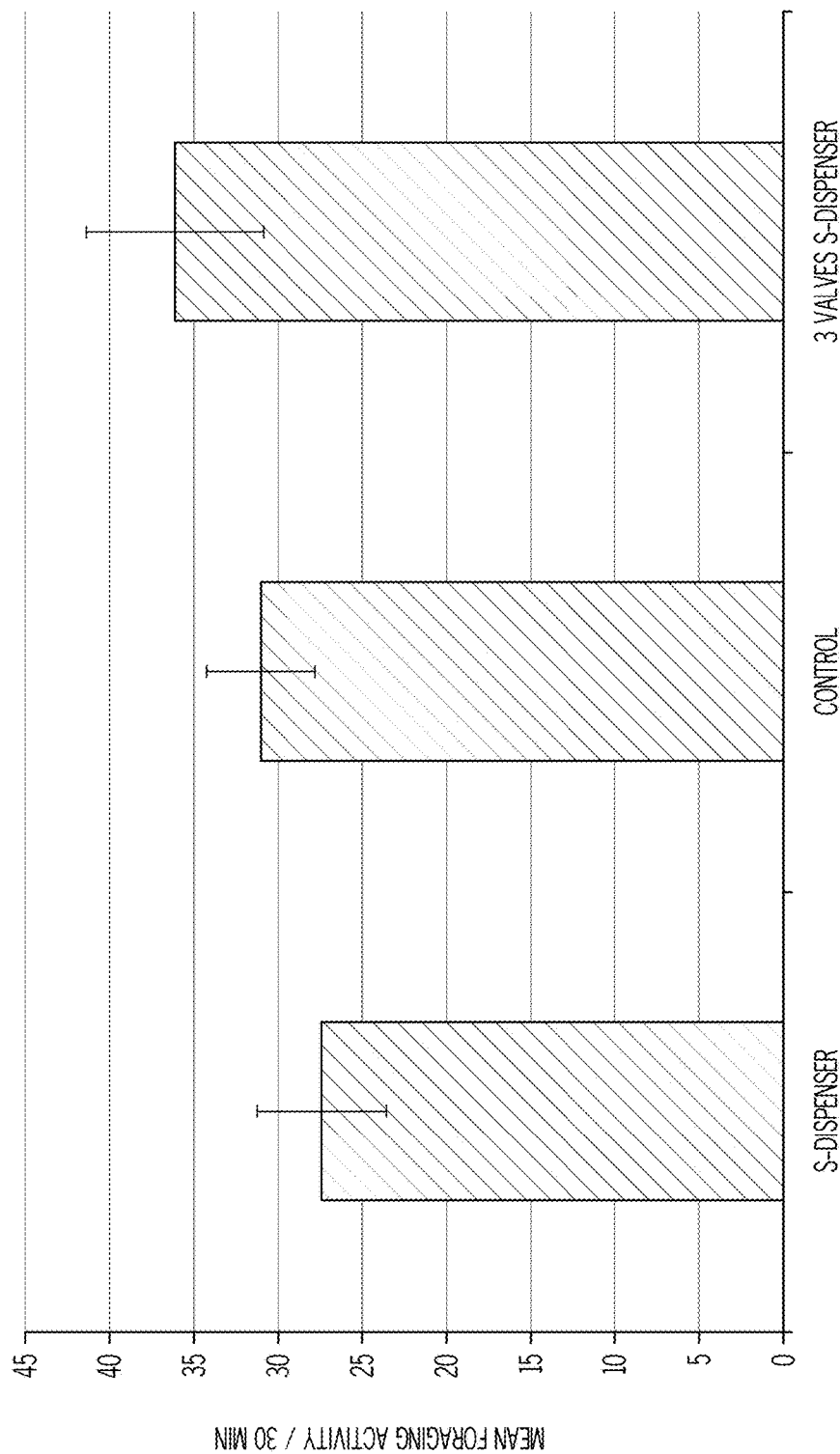
FIG. 11: Results of Example 3, showing mean foraging activity per 30 minutes for each dispenser type.

The mean foraging activity per 30 minutes for each dispenser type is shown in (FIG. 11). The foraging activity per 30-minute intervals was not significantly different between the two dispenser types and the standard hive. Moreover, effect of the third valve added to the 3 valves S-dispenser.

In summary, our results clearly indicate that the S-dispenser does not significantly affect bumblebee activity.

The invention claimed is:

1. A hive disseminator device comprising a first chamber comprising side members and a floor member, said first chamber further comprising:
   an entrance that allows bees to enter the first chamber;
   a unidirectional exit that allows bees to exit from the first chamber toward the outside of the hive and prevents bees from entering the first chamber through said exit; and
   means to immobilize a substance on the floor member of said first chamber; wherein bees are able to walk on the means to immobilize a substance.

2. The device of claim 1 including a removable cover that defines a top member of said first chamber.

3. The device of claim 1, wherein the unidirectional exit comprises a one-way door selected from a swing door, a trapdoor, or a hatch that opens in a single direction.

4. The device of claim 1, wherein the unidirectional exit comprises one or more downward directed exits at a side member of said chamber.

5. The device of claim 4, wherein the one or more downward directed exits comprise outwardly directed and diagonally cut conical tubes.

6. The device of claim 1, wherein the entrance of the first chamber further comprises means that allow bees to crawl from the hive into the first chamber.

7. The device of claim 1, further comprising means to close the entrance of the first chamber.

8. The device of claim 1, wherein the means to immobilize a substance at the floor member of said chamber is selected from a plurality of edges, a mesh, or ribbed paper.

9. The device of claim 1, further comprising a second, separate chamber having an entrance and a unidirectional exit that allows bees to enter the hive from the second chamber and prevents bees from entering the second chamber from inside the hive when leaving the hive.

10. The device of claim 9, wherein the unidirectional exit of the second chamber comprises a flexible tube, a rigid tube, a one-way door or a conical tube.

11. The device of claim 9, wherein the unidirectional exit of the second chamber comprises an outwardly directed and diagonally cut conical tube.

12. The device of claim 9, further comprising means to close the entrance of the second chamber.

13. The device of claim 9, wherein the first chamber defines an exit pathway for bees leaving the hive and wherein the second chamber defines an entrance pathway for bees entering the hive.

14. The device of claim 13, wherein the exit pathway is at least 5 centimeters long.

15. The device of claim 13, wherein the exit pathway runs in a first direction from the entrance of the first chamber towards the unidirectional exit of the first chamber, wherein the entrance pathway runs in a second direction from the entrance of the second chamber towards the unidirectional exit of the second chamber, and wherein the first direction is opposite to the second direction.

16. The device of claim 9, wherein the second chamber has a rectangular base.

17. The device of claim 9, wherein the first chamber and the second chamber taken together define a single housing.

18. The device of claim 17, wherein said single housing is an integrated part of a hive top grid.

19. The device of claim 9, wherein the first chamber and the second chamber are superimposed.

20. The device of claim 19, wherein the unidirectional exit of the first chamber is superimposed on the entrance of the second chamber.

21. The device of claim 20, wherein the unidirectional exit of the first chamber and the entrance of the second chamber are framed with a visual mark.

22. The device of claim 1, wherein the first chamber has a rectangular base, wherein the entrance of the first chamber has a tetragonal entrance and wherein the first chamber comprises an edge proximal to the entrance to retain the means to immobilize a substance at the floor member of said first chamber.

23. The device of claim 1, including means to facilitate mounting of the device in a hive.

* * * * *

UNITED STATES PATENT AND TRADEMARK OFFICE
CERTIFICATE OF CORRECTION

PATENT NO. : 10,278,370 B2
APPLICATION NO. : 13/321348
DATED : May 7, 2019
INVENTOR(S) : Kurt Hans Put et al.

Page 1 of 1

It is certified that error appears in the above-identified patent and that said Letters Patent is hereby corrected as shown below:

In the Specification

In Column 4, Line 17, after "aperture(s)", delete "a" and insert --at--, therefor.

In Column 6, Line 61, after "at", delete "there" and insert --their--, therefor.

Signed and Sealed this
Third Day of March, 2020

Andrei Iancu
*Director of the United States Patent and Trademark Office*